(12) United States Patent
Lee

(10) Patent No.: US 9,704,536 B2
(45) Date of Patent: Jul. 11, 2017

(54) VIDEO DISPLAY DEVICE AND METHOD FOR OPERATING THE SAME

(71) Applicant: LG ELECTRONICS INC., Seoul (KR)

(72) Inventor: Jaekyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 14/268,800

(22) Filed: May 2, 2014

(65) Prior Publication Data

US 2015/0139606 A1 May 21, 2015

(30) Foreign Application Priority Data

Nov. 15, 2013 (KR) .......................... 10-2013-0139358

(51) Int. Cl.
| | | |
|---|---|---|
| *G11B 27/06* | (2006.01) | |
| *G06F 17/30* | (2006.01) | |
| *H04N 21/439* | (2011.01) | |
| *H04N 21/44* | (2011.01) | |
| *H04N 21/4402* | (2011.01) | |
| *H04N 21/482* | (2011.01) | |
| *H04N 21/845* | (2011.01) | |

(Continued)

(52) U.S. Cl.
CPC ........ *G11B 27/06* (2013.01); *G06F 17/30247* (2013.01); *G11B 27/34* (2013.01); *H04N 5/775* (2013.01); *H04N 21/4394* (2013.01); *H04N 21/44008* (2013.01); *H04N 21/440245* (2013.01); *H04N 21/4826* (2013.01); *H04N 21/4828* (2013.01); *H04N 21/8456* (2013.01)

(58) Field of Classification Search
CPC ......... H04N 5/775; G11B 27/06; G11B 27/34
USPC ........................................................ 386/230
See application file for complete search history.

(56) References Cited

U.S. PATENT DOCUMENTS

| | | | |
|---|---|---|---|
| 6,956,573 B1 | 10/2005 | Bergen et al. | |
| 2004/0117825 A1* | 6/2004 | Watkins | H04N 5/782 725/40 |
| 2007/0050813 A1 | 3/2007 | Lee | |

(Continued)

FOREIGN PATENT DOCUMENTS

| | | |
|---|---|---|
| CN | 103106250 | 5/2013 |
| EP | 2525567 | 11/2012 |
| EP | 2560379 | 2/2013 |

OTHER PUBLICATIONS

European Patent Office Application Serial No. 14162403.1, Search Report dated Jul. 24, 2014, 10 pages.

(Continued)

*Primary Examiner* — Thai Tran
*Assistant Examiner* — Nien-Ru Yang
(74) *Attorney, Agent, or Firm* — Lee Hong Degerman Kang & Waimey

(57) ABSTRACT

According to one embodiment, a video display device configured to play contents including audio includes: a controller configured to receive a request for a condensed version of the contents and to search the contents based on audio characteristics information corresponding to a condensing criterion in order to output the condensed version; and a display configured to display the contents. The condensing criterion includes at least a specific word, a name of a main character, an original sound track, a sound effect or a voice print of an actor.

11 Claims, 7 Drawing Sheets

(51) Int. Cl.
*G11B 27/34* (2006.01)
*H04N 5/775* (2006.01)

(56) References Cited

U.S. PATENT DOCUMENTS

| | | | |
|---|---|---|---|
| 2007/0127735 A1* | 6/2007 | Miura | G11B 27/102 |
| | | | 381/87 |
| 2007/0237360 A1 | 10/2007 | Irie et al. | |
| 2008/0178231 A1* | 7/2008 | Hida | H04N 21/252 |
| | | | 725/87 |
| 2008/0250080 A1* | 10/2008 | Arrasvuori | G06F 17/30029 |
| | | | 707/203 |
| 2009/0083814 A1 | 3/2009 | Sekine et al. | |
| 2013/0074117 A1 | 3/2013 | Song et al. | |
| 2013/0188933 A1* | 7/2013 | Li | G11B 27/005 |
| | | | 386/343 |

OTHER PUBLICATIONS

State Intellectual Property Office of the People's Republic of China Application Serial No. 201410171807.1, Search Report dated Mar. 30, 2017, 2 pages.

* cited by examiner

FIG. 5
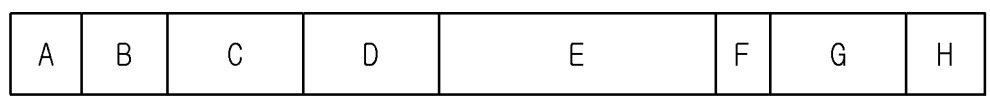
(a)
(b)
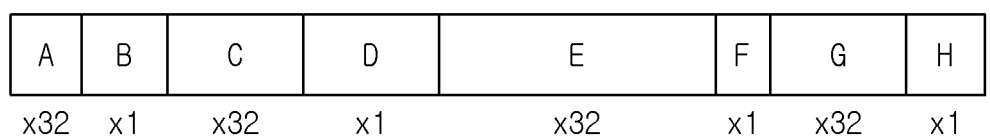
(c)
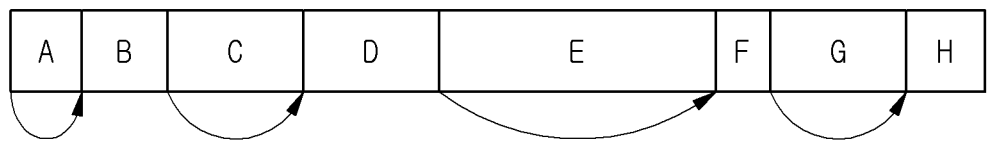
(d)

VIDEO DISPLAY DEVICE AND METHOD FOR OPERATING THE SAME

CROSS-REFERENCE TO RELATED APPLICATIONS

Pursuant to 35 U.S.C. 119(a), this application claims the benefit of earlier filing date and right of priority to Korean Patent Application No. 10-2013-0139358, filed on Nov. 15, 2013, the contents of which are hereby incorporated by reference herein in their entirety.

TECHNICAL FIELD

Embodiments of the present invention relate to a video display device and a method for operating the video display device. More particularly, embodiments of the present invention relate to a video display device and a method for operating the video display device, to output a condensed version (e.g., abbreviated version or rendering) of contents including audio contents.

BACKGROUND

Generally, many video display devices provide functions of recording or downloading contents including audio contents and then playing the contents. The contents may also include video contents. Examples of the contents include broadcast signals, multimedia files, etc. Examples of the broadcast signals include satellite broadcasting signals, cable broadcasting signals, broadcast signals that stream through networks, e.g., IPTV (Internet Protocol television) broadcasting signals, and Video On Demand (VOD) services. The multimedia files may be files that can be played by video display devices. In addition to including audio contents, the multimedia files may also include video contents.

Further, the video display devices may provide a trick mode capability. The trick mode capability may provide, for example, a double speed play function that enables a user to scan through contents more quickly. The double speed play function is executed based on a selection (or operation) by a user.

Also, many video display devices display thumbnails associated with broadcast content. The thumbnails enable a user to find broadcasting contents before contents including audio contents are played. In many cases, these thumbnails are manually generated by a user, or are randomly generated according to predetermined uniform intervals by broadcasting companies.

SUMMARY

The double speed play function is typically initiated only upon the operation of a user. That is, the double play function is initiated by the user irrespective of an analysis of the contents by the video display device. Accordingly, a scene that the user desires to watch may be missed due to the operation by the user. Also, in order for a user to find a particular scene or scenes, it is necessary for the user to focus especially hard o on the play screen during the double play.

Also, the manual inputting by broadcasting companies to generate thumbnails may require additional effort by the broadcasting companies. Also, when thumbnails are randomly created at predetermined uniform intervals, the thumbnails may not reflect what a user desires to see.

In addition, as high quality contents are supplied and a series recording function is used, memory may be consumed more rapidly, potentially leading to shortage of available storage space.

Accordingly, in order to overcome one of more of these limitations, a video display device according to embodiments of the present invention searches for an important portion(s) of contents to output only the important portion(s) of contents as a condensed version (e.g., abbreviated version or rendering) of the contents.

Embodiments of the present invention provide a video display device and a method for operating the video display device, which efficiently output a condensed version of contents including audio contents.

Embodiments of the present invention also provide a video display device and a method for operating the video display device, which allow a user to catch an important portion(s) of contents including audio contents in a relatively shorter amount of time via a condensed version of contents.

Embodiments of the present invention also provide a video display device and a method for operating the video display device, which overcome a rapid consumption of storage space by outputting a condensed version of contents having a smaller data size than the original contents.

Embodiments of the present invention also provide a video display device and a method for operating the video display device, which output a condensed version of contents by editing the contents to output only an important portion(s) of contents including audio contents.

Embodiments of the present invention also provide a video display device and a method for operating the video display device, which output a condensed version of contents by executing trick mode so as to show (e.g., highlight) only an important portion(s) of the contents including audio contents.

Embodiments of the present invention also provide a video display device and a method for operating the video display device, which output a condensed version of contents by executing skip playing (including skipping portions other than an important portion(s) of contents including audio contents.

According to one embodiment, a video display device configured to play contents including audio includes: a controller configured to receive a request for a condensed version of the contents and to search the contents based on audio characteristics information corresponding to a condensing criterion in order to output the condensed version; and a display configured to display the contents. The condensing criterion includes at least a specific word, a name of a main character, an original sound track, a sound effect or a voice print of an actor.

The controller may be further configured to obtain the condensing criterion from electronic program guide (EPG) information.

The controller may be further configured to receive the condensing criterion from a user.

The controller may be further configured to edit the contents based on the audio characteristics information in order to output the condensed version.

The controller may edit the contents based on the audio characteristics information by analyzing the contents to identify a plurality of portions of the contents, retaining at least a first portion of the plurality of portions and discarding at least a second portion of the plurality of portions. The at least a first portion has characteristics information similar to the audio characteristics information. The at least a second portion lacks characteristics information similar to the audio characteristics information.

The controller may be further configured to employ trick mode based on the audio characteristics information in order to output the condensed version.

The controller may employ trick mode based on the audio characteristics information by: analyzing the contents to identify a plurality of portions of the contents; identifying at least a first portion of the plurality of portions, the at least a first portion having characteristics information similar to the audio characteristics information; identifying at least a second portion of the plurality of portions, the at least a second portion lacking characteristics information similar to the audio characteristics information; playing the at least a first portion at a first speed; and playing the at least a second portion at a second speed faster than the first speed.

The controller may be further configured to execute skip playing of the contents based on the audio characteristics information in order to output the condensed version.

The controller may execute skip playing based on the audio characteristics information by: analyzing the contents to identify a plurality of portions of the contents; identifying at least a first portion of the plurality of portions, the at least a first portion having characteristics information similar to the audio characteristics information; identifying at least a second portion of the plurality of portions, the at least a second portion lacking characteristics information similar to the audio characteristics information; playing the at least a first portion; and skipping play of the at least a second portion.

The controller may be further configured to control the display to display a progress bar for annotating the condensed version.

According to one embodiment, a method of operating a video display device to play contents including audio includes: receiving a request for a condensed version of the contents; and searching the contents based on audio characteristics information corresponding to a condensing criterion to output the condensed version. The condensing criterion includes at least a specific word, a name of a main character, an original sound track, a sound effect or a voice print of an actor.

Features of embodiments of the present invention are set forth in the accompanying drawings and the description below. Other features will be apparent from the description and drawings, and from the claims.

BRIEF DESCRIPTION OF THE DRAWINGS

FIGS. 5(a), 5(b), 5(c) and 5(d) illustrate the outputting of a condensed version of contents according to embodiments of the present invention.

DETAILED DESCRIPTION

Figure 1:
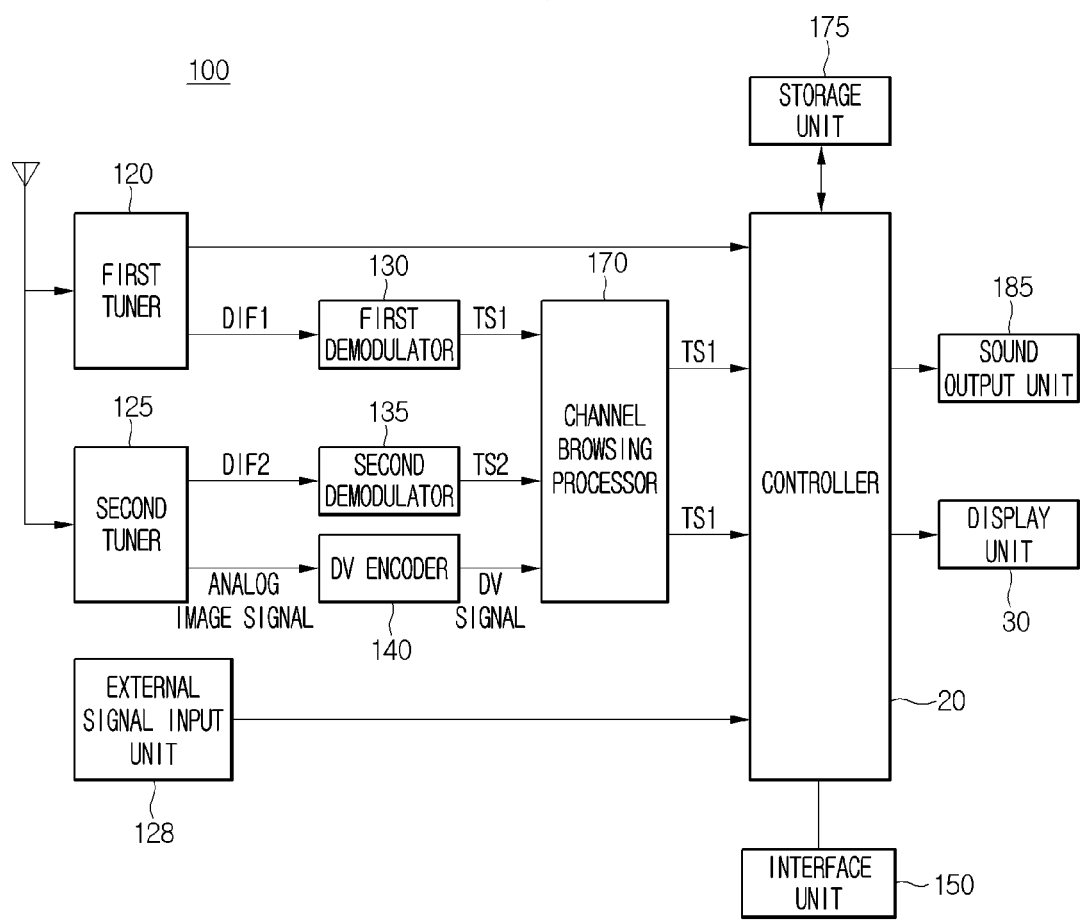
FIG. 1 is a block diagram of a video display device according to one embodiment.

Hereinafter, embodiments of the present invention will be described in detail with reference to the accompanying drawings. However, features of the present invention can be implemented in various ways, and it is understood that the present invention is not limited to the embodiments described herein. Also, certain parts that may be irrelevant with respect to the description of particular embodiments of the present invention will not be described below for purposes of brevity. Further, similar parts may be referred to using like reference numerals.

Furthermore, when it is described that a particular structure includes (or has) particular elements, it should be understood that the structure may include (or have) only those elements, or it may include (or have) other elements as well in the absence of any specific indications otherwise.

FIG. 1 is a block diagram of a video display device according to one embodiment.

Referring to FIG. 1, a video display device 100 may include a first tuner 120, a second tuner 125, an external signal input unit 128, a first demodulator 130, a second demodulator 135, an analog/digital converter 140, an interface unit 150, a controller 20, a channel browsing processor 170, a storage unit 175, a display unit 30, and a sound output unit 185.

The first tuner 120 may select, from Radio Frequency (RF) broadcast signals received through an antenna, an RF broadcast signal corresponding to a channel selected by a user, and the first tuner may convert the selected RF broadcast signal into an intermediate frequency signal or a baseband image/sound signal.

For example, when the selected RF broadcast signal is a digital broadcast signal, the RF broadcast signal may be converted into a digital IF (intermediate frequency) signal (DIF1), and, when the selected RF broadcast signal is an analog broadcast signal, the RF broadcast signal may be converted into an analog baseband image/sound signal (CVBS 1/SIF). The CVBS 1/SIF output from the first tuner 120 may be directly input to the controller 20. The first tuner 120 may be a hybrid tuner that can process digital broadcast signals and analog broadcast signals.

Also, the first tuner 120 may receive an RF broadcast signal of a single carrier according to Advanced Television Systems Committee (ATSC) specifications or may receive RF broadcast signals of two or more carriers according to Digital Video Broadcasting (DVB) specifications.

Similar to the first tuner 120, the second tuner 125 may select, from RF broadcast signals received through an antenna, an RF broadcast signal corresponding to a channel selected by a user, and may convert the selected RF broadcast signal into an intermediate frequency signal or a baseband image/sound signal.

According to one embodiment, the second tuner 125 may sequentially and periodically select, from RF broadcast signals received through the antenna, corresponding RF broadcast signals of all broadcasting channels already stored through a channel memory function, and may convert the RF broadcast signals into intermediate frequency signals or baseband image/sound signals. According to this embodiment, images of other channels that are already stored may be shown on at least a portion of a screen (e.g., a screen of the display unit 30) in a form of thumbnails. As such, RF broadcast signals of all channels that are already stored can be sequentially and periodically received.

For example, the first tuner 120 may convert a main RF broadcast signal selected by a user into an intermediate frequency signal or a baseband image/sound signal. Also, the second tuner 125 may sequentially and periodically select all RF broadcast signals (e.g., sub RF broadcast signal) or all RF broadcast signals except the main RF broadcast signal to convert the signals into intermediate frequency signals or baseband image/sound signals.

With reference to FIG. 1, the video display device 100 includes two tuners 120 and 125. However, embodiments of the present invention are not limited thereto. For example, the video display device 100 may include one tuner or three or more tuners.

The first demodulator 130 may receive the digital IF signal DIF1 converted in and output from the first tuner 120 to perform a demodulation operation.

For example, when the DIF1 output from the first tuner 120 complies with an ATSC method, the first demodulator 130 may perform 8-VSB (8-Vestigal Side Band) demodulation. Also, the first demodulator 130 may perform channel decoding.

To perform channel decoding, the first demodulator 130 according to one embodiment may include a Trellis decoder, a de-interleaver, and a Reed Solomon decoder to perform Trellis decoding, de-interleaving, and Reed Solomon decoding, respectively.

As another example, when the DIF1 output from the first tuner 120 complies with a DVB method, the first demodulator 130 may perform Coded Orthogonal Frequency Division Modulation (COFDMA). Also, the first demodulator 130 may perform channel decoding.

To perform the channel decoding, the first demodulator 130 according to one embodiment may include a convolutional decoder, a de-interleaver, and a Reed-Solomon decoder to perform convolutional decoding, de-interleaving, and Reed Solomon decoding, respectively.

The first demodulator 130 may perform demodulation and channel decoding, and may output a stream signal TS1. The stream signal TS1 may be a multiplexed signal of video, audio, and data signals. For example, the stream signal TS1 may be a multiplexed MPEG-2 TS (Transport Stream) of MPEG-2 standard video, H.265 standard video, HE-AVC standard audio, MPEG1 standard audio, HE-AAC standard audio, Dolby AC-3 standard audio, and DTS standard audio. Specifically, the MPEG-2 TS may include a header of 4 bytes and a payload of 184 bytes.

The stream signal TS1 may be input to the controller 20, and then demultiplexing and signal processing may be performed. According to this embodiment, before the stream signal TS1 is input to the controller 20, the stream signal TS1 may be input to the channel browsing processor 170 to be processed for channel browsing. The channel browsing operation will be described in more detail later.

According to one embodiment, the first demodulator 130 may be separately disposed (or configured) according to the ATSC method or the DVB method. For example, the first demodulator may include an ATSC demodulator and a DVB demodulator.

The second demodulator 135 may receive the digital IF signal DIF2 converted in and output from the second tuner 125 to perform a demodulation operation, and may output a stream signal TS2. Operation of the second demodulator 135 may be similar to the operation of the first demodulator 130. Therefore, operation of the second demodulator 135 will not described in further detail below.

When the signal output from the second tuner 125 is an analog baseband image/sound signal (CVBS2), conversion of CVSB2 to a digital signal may be performed by the analog/digital converter (or DV encoder) 140.

The analog/digital converter 140 may convert an input analog signal into a digital signal. When the input signal is a video signal, sampling and quantization may be performed to convert the video signal into a digital video. The digital signal may be a signal that is not coded. The converted digital video (DV) signal may be input to the channel browsing processor 170 to be processed.

The external signal input unit 128 may accept input signals from an external device. For such a purpose, the external signal input unit 128 according to one embodiment may include an A/V input/output unit and/or a wireless communication unit.

The external signal input unit 128 may be connected to external devices such as Digital Versatile Disk (DVD) devices, blu-ray devices, game consoles, camcorders, and computers (e.g., notebook computers) to deliver external input video signals, external input audio signals, and external input data signals to the controller 20 of the video display device 100. Also, video, audio, and data signals processed in the controller 20 may be output to other external devices.

For input/output of image/sound from/to an external device, an A/V input/output unit of the external signal input unit 128 may include an Ethernet terminal, a USB (Universal Serial Bus) terminal, a Composite Video Banking Sync (CVBS) terminal, a component terminal, a S-video terminal (analog), a Digital Visual Interface (DVI) terminal, a High Definition Multimedia Interface (HDMI) terminal, an RGB terminal, a D-SUB terminal, an IEEE 1394 terminal, an SPDIF terminal, a liquid HD terminal, and/or a SCART terminal.

Although not expressly shown in FIG. 1, various input signals input through the external signal input unit 128 may be input to the channel browsing processor 170, to perform a thumbnail image extraction process.

For example, analog signals input through the CVBS terminal and the S-video terminal may be converted into digital signals and then may be input to the channel browsing processor 170. Digital signals input through other input terminals may be directly input to the channel browsing processor 170 without analog/digital conversion.

Here, digital signals input to and output by the external signal input unit 128 may be streamed signals, for example, at least MPEG-2 standard video, MPEG-2 TS (Transport Stream) multiplexed with Dolby AC-3 standard audio, multiplexed MNT stream, or multiplexed MPEG-DASH stream.

A wireless communication unit of the external signal input unit 128 may perform wireless Internet access. For wireless Internet access, WLAN (Wireless LAN) (Wi-Fi), Wireless broadband (Wibro), World Interoperability for Microwave Access (Wimax), and/or High Speed Downlink Packet Access (HSDPA) may be utilized.

Also, the wireless communication unit may perform wireless local communication with other electronic devices. For example, Bluetooth, Radio Frequency Identification (RFID), Infrared Data Association (IrDA), Ultra Wideband (UWB), and/or ZigBee may be utilized.

Also, the external signal input unit 128 may be connected to various set-top boxes through at least one of the various terminals noted earlier to perform input/output operations together with the set-top box.

For example, when the set-top box is a set-top box for Internet Protocol (IP) TV, image, sound and data signals which are processed in the IPTV set-top box may be delivered to the controller 20 via the external signal input unit 128, and the signals processed in the controller 20 may also be delivered to the IPTV set-top box via the external signal input unit.

Image, sound and data signals which are processed in the IPTV set-top box may pass through the channel browsing processor 170 to be processed in the controller 20.

The IPTV may include ADSL-TV, VDSL-TV and/or FTTH-TV according to the types of transmission networks, and may include TV over DSL, Video over DSL, TV overIP (TVIP), and/or Broadband TV (BTV). Also, IPTV may include a pull browsing TV and an Internet TV accessible to the Internet.

The interface unit 150 may deliver an input signal from a user to the controller 20, or may deliver a signal from the controller 20 to the user. For example, the interface unit 150 may receive user input signals such as power on/off, channel selection, and screen setting from a remote controller 200 (see, e.g., FIG. 2) according to various communication methods such as a RF communication method and an IR communication method. Also, the interface unit 150 may transmit a signal from the controller 20 to the remote controller 200.

According to one embodiment, the interface unit 150 may include a motion recognition unit 10, and thus may recognize a motion of the user to output information related to the motion to the controller 20. This will be described in more detail with reference to FIG. 2.

The controller 20 may demultiplex the input stream, and may process the demultiplexed signals to generate and output signals for image and sound output. In addition, the controller 20 may control overall operations of the video display device 100.

Although not explicitly shown in FIG. 1, the controller 20 may include a demultiplexing unit, an image processing unit, a sound processing unit, and a user input signal processing unit.

The controller 20 may demultiplex an input stream signal, e.g., MPEG-2 TS, to separate the stream signal into video, audio, and data signals.

Also, the controller 20 may perform image processing of demultiplexed video. For example, when the demultiplexed video is a coded video, the controller 20 may decode the demultiplexed video. Specifically, when the demultiplexed video is a coded video of MPEG-2 standard, the demultiplexed video may be decoded by an MPEG-2 decoder. Also, when the multiplexed video is a coded video of H.264 standard in compliance with a Digital Multimedia Broadcasting (DMB) method or DVB-H, the multiplexed video may be decoded by an H.264 decoder.

Also, the controller 20 may process the brightness, tint, and color of the video.

Video that is image-processed by the controller 20 may be input to the display unit 30 to be displayed. Also, video may be input to an external output terminal that is connected to an external output device.

Also, the controller 20 may perform sound processing of demultiplexed audio contents. For example, when the demultiplexed audio is a coded audio, the controller 20 may decode the demultiplexed audio. Specifically, when the demultiplexed audio is a coded audio of MPEG-2 standard, the demultiplexed audio may be decoded by an MPEG-2 decoder.

Also, when the demultiplexed audio is an encoded audio of MPEG 4 BSAC (Bit Sliced Arithmetic Coding) standard according to a terrestrial DMB (Digital Multimedia Broadcasting) method, the demultiplexed audio may be decoded by an MPEG 4 decoder. Also, when the demultiplexed audio is an encoded audio of MPEG 2 AAC (Advanced Audio Codec) standard according to a satellite DMB method or DVB-H, the demultiplexed audio may be decoded by an AAC decoder.

Also, the controller 20 may control base, treble, and volume of the audio.

Audio processed by the controller 20 may be input to the sound output unit 185, e.g., a speaker, to be reproduced. Also, audio may be input to an external output terminal that is connected to an external output device.

Also, the controller 20 may perform data processing of demultiplexed data signals. For example, when the demultiplexed data signal is a coded data signal, the controller 20 may decode the demultiplexed data signal. The coded data signal may include Electronic Program Guide (EPG) information including broadcast information such as start times and finish times of broadcast programs of each channel.

For example, for signals of an ATSC type, EPG information may be ATSC-PSIP (ATSC-Program and System Information Protocol), and, for signals of a DVB type, EPG information may include DVB-SI (DVB-Service Information). ATSC-PSIP or DVB-SI information may be included in a stream format, e.g., header (4 bytes) of MPEG-2 TS.

Also, the controller 20 may perform On Screen Display (OSD) processing. Specifically, the controller 20 may generate a signal for displaying various kinds of information on the screen of the display unit 30 in a form of graphic or text, based on at least image-processed video or data-processed data signal and a user input signal from the remote controller 200. The generated signal may be input to the display unit 30 together with the image-processed video and the data-processed data signal.

The signal generated for the graphic or text display may include a user interface screen of the video display device 100, various menu screens, and various data such as widgets and icons.

Also, the controller 20 may perform a Personal Video Recorder (PVR) function of recording broadcast signals to store and play the broadcast signals in and from the storage unit 175. The controller 20 may perform a scheduled recording function of performing recording at a predetermined time. The controller 20 may set the scheduled recording based on a time input by a user. Also, the controller 20 may set the scheduled recording based on EPG information extracted from broadcast information such as information transmitted from DVB SI, PSIP, or a data server.

Also, the controller 20 may provide a time shifting function of playing current broadcasting concurrent with recording.

The controller 20 may provide a trick mode function. The trick mode function may include Fast Forward (FF) for playing at a speed faster than a normal speed in a forward direction, Fast Rewind (FR) for playing at a speed faster than the normal speed in a backward direction, play, stop, forward slow motion for playing at a speed slower than the normal speed in the forward direction, and rewind slow motion for playing at a speed slower than the normal speed in the backward direction. Fast Forward and Fast Rewind may involve playing all frames at a speed faster than a reference speed. Alternatively, Fast Forward and Fast Rewind may involve playing only a portion of all frames at a faster speed.

The controller 20 may provide a skip playing function for moving play to a specific point. The skip playing function may include forward skip playing for moving play to a specific point in the forward direction and backward skip playing for moving play to a specific point in the backward direction. In this disclosure, forward skip playing and backward skip playing may also be referred to as Forward Jump (FJ) and Backward Jump (BJ), respectively.

The controller 20 may provide a series recording function of setting, at one time, a scheduled recording according to which consecutive episodes of the same television program are recorded. For example, when a user sets the series recording for a specific TV series including thirteen episodes, the controller 20 may set the scheduled recording for all of the episodes, from the first episode to the thirteenth episode. The controller 20 may perform series recording based on information extracted from broadcast information such as information transmitted from DVB SI, PSIP, or the data server. According to one embodiment, the controller 20 may perform the series recording based on the title of a television program. According to another embodiment, the controller 20 may perform the series recording based on at least a content identifier or a group identifier of a television program included in the broadcast information.

The channel browsing processor 170 may perform browsing processing on at least broadcast signals corresponding to received channels or various kinds of input videos input through the external signal input unit 128.

For example, the channel browsing processor 170 may receive the demodulated and channel-decoded stream signal TS1 or TS2 from the first demodulator 130 or the second demodulator 135, or may receive the DV signal converted in the analog/digital converter 140 to demultiplex the stream signal TS1 or TS2. The channel browsing processor 170 may extract a portion of demultiplexed video, and may perform multiplexing based on the video including the extracted video to output a new stream signal TSa. For example, the stream signal TSa may be in a form of MPEG 2 TS.

Also, the channel browsing processor 170 may output a main stream signal TSb corresponding to a main video displayed on a main region among the video displayed on the display unit 30 without separate processing, and may also output a sub stream signal TSa corresponding to a sub video displayed on a sub region among the video displayed on the display unit 30 after performing the channel browsing processing as described earlier.

According to this embodiment, when a channel list is displayed on the display unit 30 by extracting a portion of broadcast signals of a plurality of channels through the channel browsing processor 170 to recode the extracted portion into a form of a stream, at least a portion of a broadcast signal image of the plurality of channels may be shown on a screen of the display unit 30 in a form of a thumbnail(s). Thus, a user can intuitively recognize that displayed contents are being broadcast in another channel.

When the channel browsing processor 170 displays an external input list on the display unit 30 by extracting a portion of various external input images input through the external signal input unit 128 to recode the extracted portion into a form of a stream, at least a portion of the external input images from a plurality of external input devices may be displayed on the screen in a form of a thumbnail(s). Thus, a user can intuitively recognize that the displayed contents are input from the external input devices.

When the channel browsing processor 170 displays both a channel list and an external input list on the display unit 30 by extracting a portion of the broadcast signal images of the channels and a portion of the external input images to recode the extracted portions into a form of stream, at least a portion of the broadcast signal images of the plurality of channels and the external input images from the plurality of external input devices may be displayed on the screen in a form of a thumbnail(s).

Thus, a user can intuitively recognize that the displayed contents are input from the plurality of channels and external input devices.

The storage unit 175 may store programs for signal processing and control for execution by the controller 20, and may also store video, audio, and data signals that are signal-processed.

Also, the storage unit 175 may perform a function of temporarily storing image, sound, or data signals that are input from the external signal input unit 128.

The storage unit 175 may store broadcast channels through a channel memory function. For this purpose, the storage unit 175 may include at least a flash memory type device, a hard disk type device, a multimedia micro card type device, card type memories (e.g., SD or XD memories), RAM, or ROM (EEPROM etc.).

In FIG. 1, the storage unit 175 is shown as being provided separately from the controller 20. However, it is appreciated that the storage unit may be provided as a part of the controller 20. Also, the storage unit 175 may be a storage medium connected through an external input port.

The video display device 100 may play files (e.g., video files, still image files, and music files, as well as document files) to deliver the files to a user.

The display unit 30 may generate a driving signal by converting video and data signals processed in the controller 20, OSD (on-screen display) signals, and video and data signals received from the external signal input unit 128 to R, G, and B signals.

The display unit 30 may be implemented as any of various types (e.g., PDP, LCD, OLED, flexible display, and 3D display). According to a further embodiment, the display unit 30 may include a touch screen for use as an input device as well as an output device.

The sound output unit 185 may receive signals, e.g., stereo signals, 3.1 channel signals, or 5.1 channel signals that are sound-processed in the controller 20 to reproduce the signals as sounds. The sound output unit 185 may be implemented as any of various types of speakers.

The video display device 100 may be a fixed-type digital broadcast receiver that can receive at least ATSC type (8-VSB type) digital broadcasting, DVB-T type (COFDM type) digital broadcasting, or ISDB-T type (BST-OFDM type) digital broadcasting. Also, the video display device 100 may be a mobile-type digital broadcast receiver that can receive at least terrestrial DMB type digital broadcasting, satellite DMB type digital broadcasting, ATSC-M/H type digital broadcasting, DVB-H type (COFDM type) digital broadcasting, and mediaFLO (Forward Link Only) type digital broadcasting. Also, the video display device 100 may be a digital broadcast receiver for cable, satellite communication, and IPTV.

FIGS. 2(a), 2(b) and 2(c) illustrate a method for controlling an operation of a video display device using a remote controller according to one embodiment.

With reference to FIG. 2A, a pointer 205 corresponding to a remote controller 200 may be displayed on the display unit 30 of the video display device 100.

A user may move the remote controller 200 vertically or horizontally or rotate the remote controller 200. Movement of the pointer 205 which is displayed on the display unit 30 may correspond to the movement of the remote controller 200. The remote controller 200 may be called a space remote controller because the pointer 205 moves according to movement of the remote controller in 3D space (see, e.g., FIG. 2(*b*)).

Figure 2:
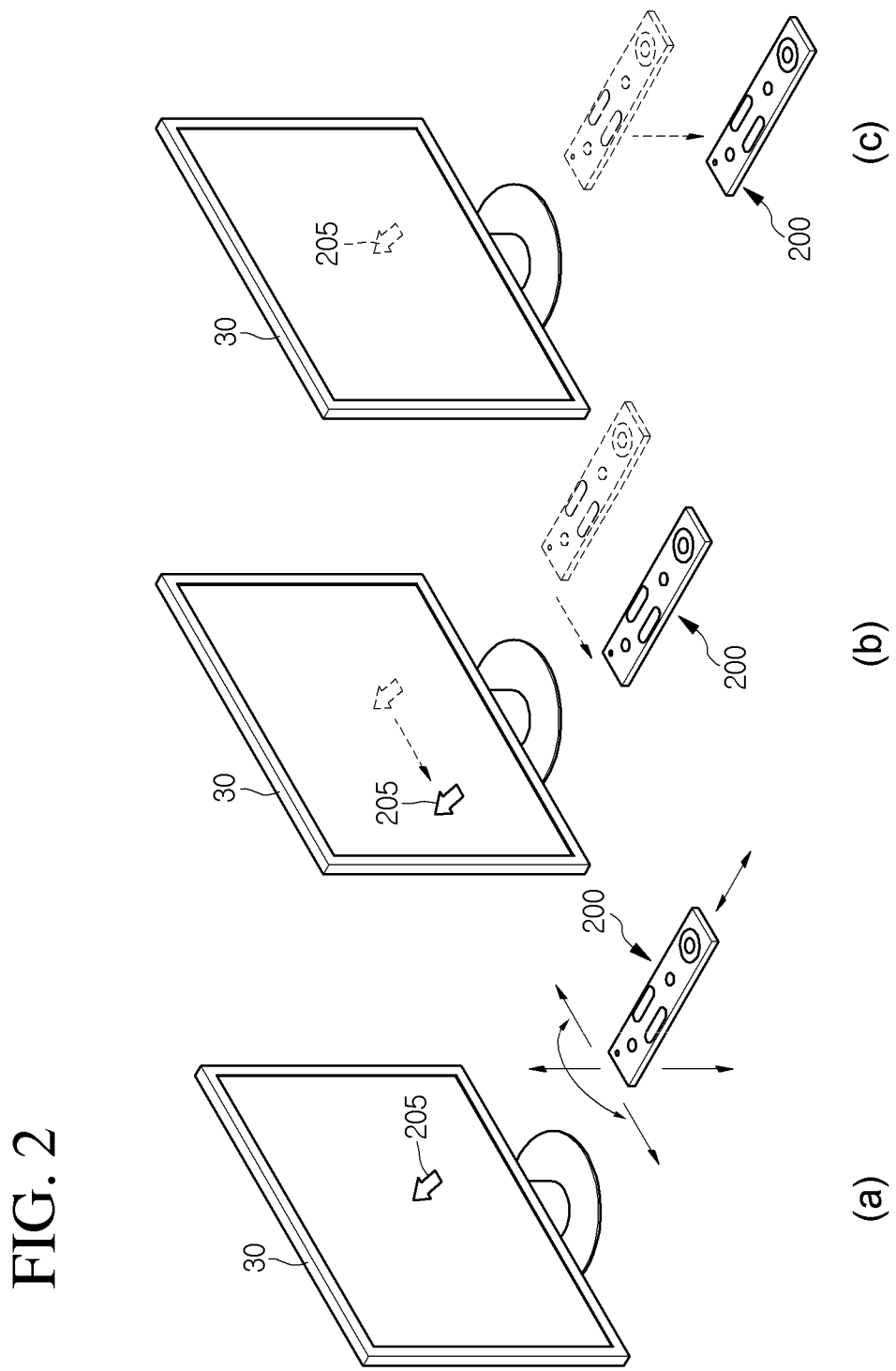
FIGS. 2(a), 2(b) and 2(c) illustrate a method for controlling an operation of a video display device using a remote controller according to one embodiment.

With reference to FIG. 2(*b*), when a user moves the remote controller 200 to the left, the pointer 205 displayed on the display unit 30 also moves to the left accordingly.

Information about the movement of the remote controller 200 that is sensed through a sensor of the remote controller 200 may be transmitted to the video display device 100. The video display device 100 may calculate the coordinates of the pointer 205 from (or based on) the information about the movement of the remote controller 200. The video display device 100 may control the display unit 30 to display the pointer 205 to correspond to the calculated coordinates.

With reference to FIG. 2(*c*), a user moves the remote controller 200 to be further away from the display unit 30 when a specific button of the remote controller 200 is pressed. Accordingly, a selection region displayed by the display unit 30 corresponding to the pointer 205 may be zoomed in. The display of the selection region is thereby expanded in size.

In contrast, when a user moves the remote controller 200 to be closer to the display unit 30, the selection region displayed by the display unit 30 corresponding to the pointer 205 may be zoomed out. The display of the selection region is thereby reduced in size.

According to an alternative embodiment, when the remote controller 200 is moved further away from the display unit 30, the selection region may be zoomed out, and, when the remote controller 200 is moved closer to the display unit 30, the selection region may be zoomed in.

According to one embodiment, when a specific button of the remote controller 200 is pressed, vertical or horizontal movement may not be recognized. That is, when the remote controller 200 is moved further from the display unit 30 (backwards) or closer to the display unit 30 (forwards), the vertical or horizontal movement of the remote controller 200 is not recognized, and only the backward or forward movement may be recognized. When the specific button of the remote controller 200 is not pressed, however, the position of the pointer 205 moves according to the vertical or horizontal movement of the remote controller 200.

According to one embodiment, the speed or direction of the movement of the pointer 205 may correspond to the speed or direction of the movement of the remote controller 200.

The pointer 205 corresponding to the operation of the remote controller 200 may be an object displayed on the display unit 30. As illustrated in FIGS. 2(*a*) and 2(*b*), the pointer may take the form of an arrow. However, it is understood that the pointer may take other forms. For example, the pointer may take the form of dots, cursors, prompts, and/or thick outer lines. Also, the pointer 205 may be displayed as a point with respect to a horizontal axis and a vertical axis on the display unit 30, and may be displayed corresponding to multiple points including lines, surfaces, etc.

Hereinafter, with reference to FIGS. 3, 4, 5(*a*), 5(*b*), 5(*c*), 5(*d*), 6*a* and 7, methods associated with outputting a condensed version (e.g., an abbreviated version or rendering) of original contents including audio contents will be described in more detail. The condensed version may be output by the video display device 100 using audio characteristics information that is extracted from the contents including audio contents. As will be described in more detail later, a duration (e.g., run time) of the condensed version is expected to be shorter than a duration of the original contents.

Characteristics information is used for distinguishing (e.g., identifying or recognizing) particular audio contents or particular video contents. For example, audio characteristics information may be used to identify an audio segment that is part of the contents that include audio contents. Similarly, video characteristics information may be used to identify a video segment that is part of contents that includes video contents in addition to audio. According to one embodiment, characteristics information may include signal characteristics of audio or video contents. For example, the signal characteristics may include at least frequency characteristics, zero crossing rate, tempo, average spectrum, spectral flatness, prominent tones across a set of bands, or bandwidth. Also, the characteristics information may include a finger print, a signature, and/or a watermark. The watermark may include a perceptible watermark that is perceptible by a user together with a logo displayed on a playing screen, or an imperceptible watermark that deforms contents but is not ordinarily perceivable by a user. The fingerprint may be characteristics information extracted from a portion of video contents included in the contents (for example, a portion of a frame) or from a portion of audio contents (for example, a pattern of an audio sample). The fingerprint may also be referred to as a signature. According to one embodiment, the fingerprint may include a voice print for distinguishing (e.g., identifying or recognizing) a voice of a specific character.

A condensing criterion is a criterion used for outputting the condensed version. For example, the condensed version may contain (or highlight) only portions or segments of the contents that match the condensing criterion in a particular manner. (That is, the condensed version may not contain (or highlight) other portions or segments of the contents that do not match the condensing criterion in the particular manner.) Condensing criterion characteristics information is characteristics information that corresponds to one or more condensing criteria.

For example, a condensing criterion for video contents may include at least the logo for a specific broadcasting company, the logo for a specific program, or the image of a specific actor/actress. Accordingly, condensing criterion characteristics information may be information that can be used to distinguish (e.g., identify or recognize) at least the logo for the specific broadcasting company, the logo for the specific program, or the image of the specific actor/actress.

As another example, a condensing criterion for audio contents may include at least the logo-song (e.g., jingle or theme song) for a specific broadcasting company, original sound track (OST) (e.g., theme song) for a specific program, a sound effect, a specific actor/actress, advertisement music, or a specific word. Accordingly, condensing criterion characteristics information may be information that can be used to distinguish (e.g., identify or recognize) at least the logo-song for the specific broadcasting company, the original sound track (OST) for the specific program, the sound effect, the specific actor/actress, the advertisement music, or the specific word. According to a particular embodiment, characteristics information for distinguishing the specific actor/actress may be a voice print for the specific actor/actress.

Audio contents typically occupy less data than video contents. Accordingly, operations involving audio contents (e.g., extracting audio contents, comparing characteristics information of the audio contents (for example, against condensing criterion characteristics information), and searching for specific audio contents) may require less time than similar operations involving video contents. Also, the quantity of data processes (e.g., computational complexity) needed for the operations involving audio contents may be lighter than the quantity for data processes needed for similar operations involving video contents. Accordingly, it may be possible to perform operations involving the audio contents using the controller 20, even if the performance power of the controller is not of a particularly high level. In such a situation, outputting the condensed version by using characteristics information of audio contents may be more effective than outputting the condensed version by using characteristics information of video contents. This is because extracting characteristics information of audio contents, comparing the characteristics information of the audio contents (against certain parameter(s)) and searching for characteristics information of the audio contents may be less computationally intensive than performing similar operations on video contents. However, it is appreciated that certain controllers may be well configured to perform such operations on video contents.

A logo song (e.g., theme song) for a specific program may be repeated at the start of the specific program and at the end of the specific program, and it may be unlikely that the logo song is played at other points that are between the start and the end of the specific program (e.g., the middle of the specific program). Accordingly, according to one embodiment, when characteristics information for distinguishing the logo song for a specific program is used, the controller 20 may readily determine the starting point and the ending point of the specific program.

An original sound track (OST) used for a specific program may be repeated based on (or so as to match) the subject matter of particular scenes in the program, and it may be very unlikely that the original sound track (OST) is repeated during other scenes. For example, a love theme for main characters may be repeatedly played during scenes related to the romance of the main characters. However, the love theme is not played during other scenes that are not related to this romance. Accordingly, when characteristics information for distinguishing an original sound track (OST) for the specific program is used, the controller 20 may readily determine the subject matter of particular scenes (e.g., scenes related to or involving the romance of the main characters).

Also, a sound effect for a specific program may be used according to the subject matter of particular scenes of the program. For example, a shooting sound (e.g., gunshot effect) may be used during an action scene. Also, a screaming sound may be used during a horror scene in a horror story. Accordingly, when characteristics information for distinguishing a sound effect for a specific program is used, the controller 20 may readily determine the subject matter of particular scenes (e.g., action scenes, horror scenes).

Also, an actor/actress typically acts using a steady (or relatively constant) tone (e.g., vocal tone or vocal character) in a given work (e.g., a given movie or TV show). Accordingly, when characteristics information for distinguishing a specific actor/actress is used, the controller 20 may accurately and readily distinguish a scene in which the specific actor/actress appears.

Also, a specific word may indicate the subject matter of a broadcast. For example, in a broadcast signal for a news program, the word 'election' may repeatedly appear at a portion (or portions) of the news program in which election-related news is reported. Accordingly, when characteristics information for distinguishing a specific word is used, the controller 20 may readily distinguish the subject matter for particular portions of the contents including audio contents.

Also, advertisement music commonly accompany advertisements (or commercials) that are played during a broadcast (e.g., during advertising or commercial breaks). Accordingly, when characteristics information for distinguishing advertisement music for a specific program is used, the controller 20 may readily determine the section(s) where advertisements appear.

Accordingly, when a video display device 100 outputs a condensed version of contents including audio contents using characteristics information of audio contents, the video display device 100 may efficiently deliver only important contents to a user (or contents that the user deems to be more important than other contents).

Figure 3:
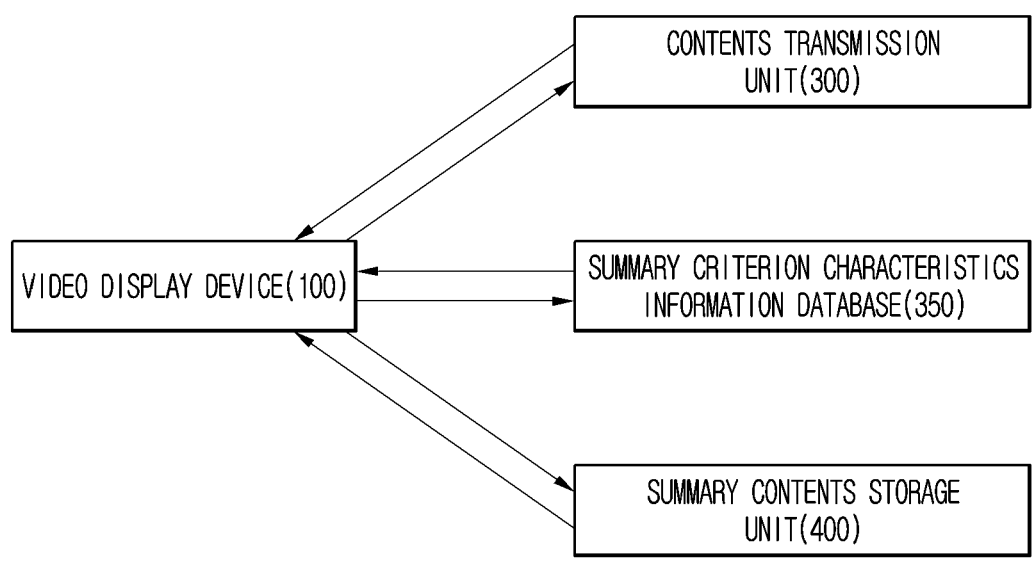
FIG. 3 illustrates data flow between a video display device and a condensing criterion characteristics information database and a broadcast information database according to one embodiment.

FIG. 3 illustrates data flow between a video display device and a condensing criterion characteristics information database and a broadcast information database according to one embodiment.

With reference to FIG. 3, the video display device 100 may interact with a contents transmission unit 300, a condensing criterion characteristics information database 350, and a condensed version storage unit 400.

The contents transmission unit 300 transmits contents including audio contents to the video display device 100. The contents transmission unit 300 may be a broadcasting company providing terrestrial broadcasting, cable broadcasting, or satellite broadcasting. Also, the contents transmission unit 300 may be an IPTV server providing IPTV broadcasting or a streaming server providing VOD service. Also, the contents transmission unit 300 may be a storage medium that stores recorded contents including multimedia files or audio files. According to one embodiment, the contents transmission unit 300 may exist outside of (or separate from) the video display device 100. According to another embodiment, the contents transmission unit 300 may be included in the video display device 100. According to a further embodiment, the contents transmission unit 300 may be provided in the storage unit 175 (see, e.g., FIG. 1).

The condensing criterion characteristics information database 350 may be a data base storing characteristics information for various condensing criteria. The controller 20 of the video display device 100 may receive condensing criterion characteristics information from the condensing criterion characteristics information database 350.

Condensing criterion characteristics information stored in the condensing criterion characteristics information database 350 may be transmitted from an external database. Also, condensing criterion characteristics information stored in the condensing criterion characteristics information database 350 may be stored based on user input. For example, the controller 20 may receive from a user an input with respect to a specific portion of contents including audio contents, and the controller may extract characteristics information corresponding to the specific portion. The controller 20 may then store the extracted characteristics information in the condensing criterion characteristics information database 350.

According to one embodiment, the condensing criterion characteristics information database 350 may exist outside the video display device 100. According to another embodiment, the condensing criterion characteristics information database 350 may be included in the video display device 100. According to a further embodiment, the condensing criterion characteristics information database 350 may be provided in the storage unit 175.

The condensed version storage unit 400 may store the condensed version outputted by the controller 20 or information needed for outputting the condensed version. According to one embodiment, the controller 20 may store in the condensed version storage unit 400 a condensed version of contents that was edited so as to include only important contents. According to another embodiment, the controller 20 may generate and store an index that indicates a target output or information needed to output the condensed version. According to this embodiment, the controller 20 may execute skip playing based on reading the index from the condensed version storage unit 400, or may output the condensed version by employing trick mode.

According to one embodiment, the condensed version storage unit 400 may exist outside the video display device 100. According to another embodiment, the condensed version storage unit 400 may be included in the video display device 100. According to a further embodiment, the condensed version storage unit 400 may be provided in the storage unit 175.

Figure 4:
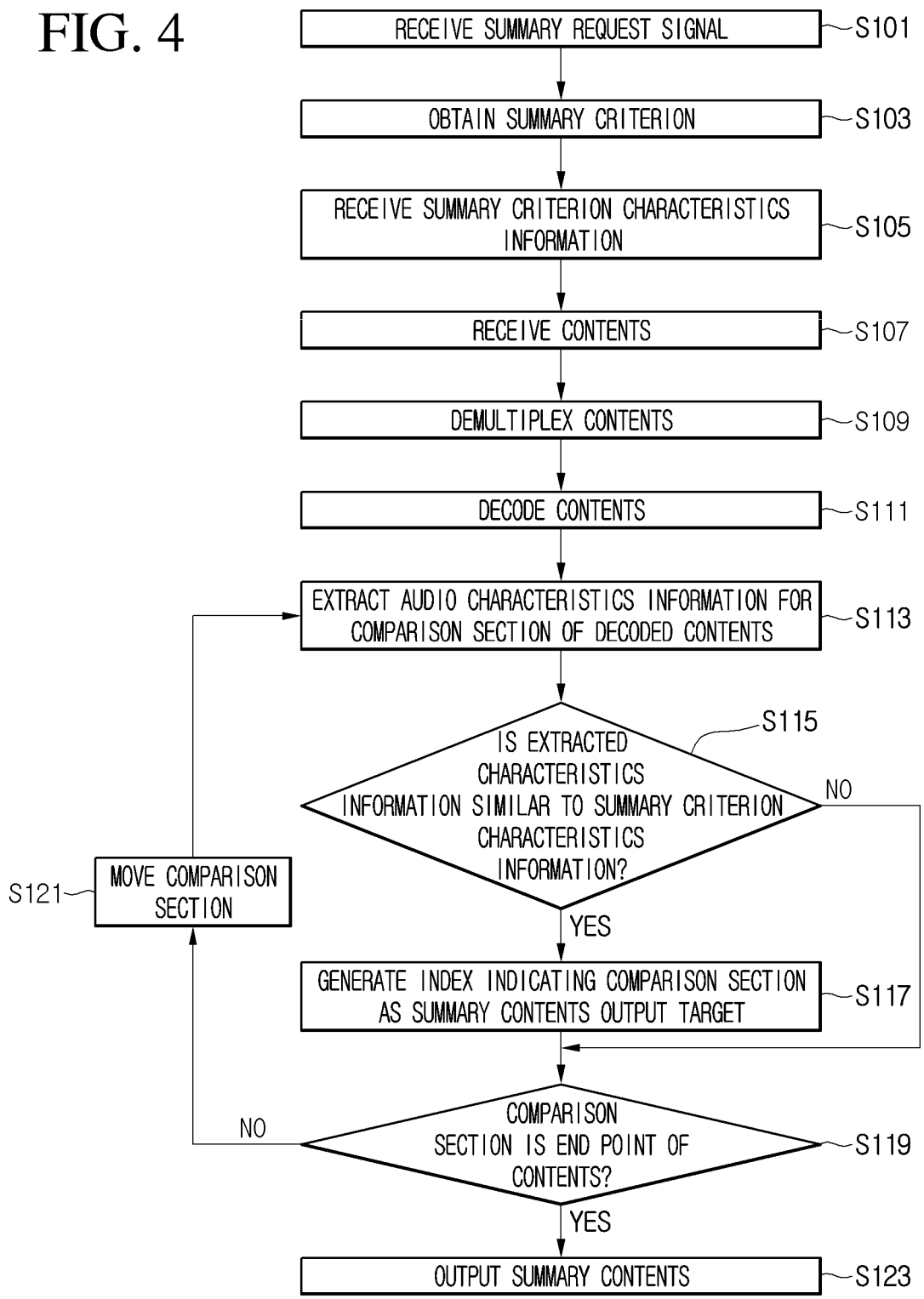
FIG. 4 is a flowchart illustrating a method of operating a video display device according to one embodiment.

FIG. 4 is a flowchart illustrating a method of operating a video display device according to one embodiment.

With reference to FIG. 4, the controller 20 may receive a condensed version request signal (S101). According to one embodiment, the controller 20 may receive a condensed version request signal from a user. Via this request signal, the user requests a condensed version (e.g., an abbreviated version or rendering) of contents including audio contents.

According to one embodiment, the controller 20 may output the condensed version by searching the contents for particular portions or segments, based on audio characteristics information corresponding to one or more condensing criteria. This will be described in more detail later with continued reference to FIG. 4.

The controller 20 may acquire the condensing criterion (S103). As was described earlier, the condensing criterion may be information that is used as a reference for outputting the condensed version. Condensing criterion may include criteria with respect to audio and/or video. The condensing criteria may include at least a specific word, a name of a main character, an original sound track, a sound effect, or a voice print of an actor/actress. When words, names of main characters (e.g., of a television program or a movie) and a voice print of an actor/actress are used as the condensing criteria, the controller 20 may output the condensed version according to a synopsis (a written synopsis) of the contents. When the original sound track and the sound effect are used as the condensing criteria, the controller 20 may output the condensed version based on a mood conveyed by the contents. Also, when a combination of a main character's name, an original sound track, a sound effect, and a voice print of an actor/actress is used as the condensing criterion, the controller 20 may output the condensed version such that a user can discern (or grasp) both the mood and the synopsis of the contents.

According to one embodiment, the controller 20 may acquire the condensing criterion based on input by a user. When an input with respect to a specific actor/actress is received from the user (e.g., via interface unit 150 (see FIG. 1)), the controller 20 may acquire the identification of the specific actor/actress as the condensing criterion. Alternatively, when an input with respect to a specific advertisement is received from a user, the controller 20 may acquire the advertisement music of the specific advertisement as the condensing criterion. According to another embodiment, the controller 20 may acquire the condensing criterion based on an initial setting of the video display device 100.

According to another embodiment, the controller 20 may acquire the condensing criterion based on EPG information. Specifically, EPG information may include information regarding at least a genre, a name of the leading actor/actress, the name of a main character, and an original sound track for a specific broadcast program. According to this embodiment, the controller 20 may extract the information regarding at least the genre, the name of the leading actor/actress, the name of a main character, and the original sound track from EPG information. The EPG information may be information received from DVB SI, PSIP, or a data server. As such, the controller 20 may acquire the condensing criterion based on information extracted from EPG information.

For example, the controller 20 may extract the genre of the contents from EPG information. The controller 20 may acquire one or more specific sound effects as the condensing criteria based on the extracted genre. For example, when the extracted genre is action, the controller 20 may acquire a shooting sound (e.g., gunshot effect) and a sound of an explosion as the condensing criteria. As another example, the controller may extract the name of the leading actor/actress of the contents from EPG information. The controller 20 may acquire characteristics information for identifying the leading actor/actress as the condensing criterion, based on the extracted name of the leading actor/actress. For example, the controller 20 may acquire a voice print of the leading actor/actress as the condensing criterion. As another example, the controller 20 may acquire video characteristics information for identifying the face of the leading actor/actress together with the voice print as the condensing criteria.

According to another embodiment, the controller 20 may extract the synopsis (written synopsis) of the contents from EPG information and may extract the name of the leading actor/actress from the synopsis. Thus, the controller 20 may acquire the name of the leading actor/actress in contents as the condensing criterion. According to another embodiment, the controller 20 may acquire the presence or absence of audio in the contents as the condensing criterion. Specifically, the controller 20 may interpret a segment or portion that lacks audio as being a segment or portion that would not be particularly important to a viewer. According to another embodiment, the controller 20 may acquire the presence or absence of advertisements as the condensing criterion. Specifically, the controller 20 may interpret a segment or portion that lacks advertisements as being a segment or portion that would be important to a viewer. According to this embodiment, the condensing criterion characteristics information (to be explained more generally below) may be related to advertisement music. Also, images included in the advertisement may be acquired as the condensing criterion characteristics information together with the advertisement music.

With continued reference to FIG. 4, the controller 20 may acquire characteristics information corresponding to the condensing criterion (S105). The characteristics information corresponding to the condensing criterion may be characteristics information for identifying segments or portions that match the condensing criterion. In particular, the condensing criterion characteristics information may be audio characteristics information. As described earlier, outputting the condensed version of contents using audio characteristics information might be more efficient than outputting the condensed version of contents using video characteristics information. With respect to audio characteristics information, when the condensing criterion is the leading actor/actress, characteristics information corresponding to the condensing criterion may be characteristics information for identifying the leading actor/actress, e.g., the voice print of the leading actor/actress. When the condensing criterion is the name of the main character, characteristics information corresponding to the condensing criterion may be characteristics information for identifying the name of the main character. When the condensing criterion is the original sound track, characteristics information corresponding to the condensing criterion may be characteristics information for identifying the original sound track.

The controller 20 may acquire characteristics information corresponding to the condensing criterion (i.e., condensing criterion characteristics information) from the condensing criterion characteristics information database 350 (see, e.g., FIG. 3). This will be described in more detail below.

The controller 20 may request from the condensing criterion characteristics information database 350 characteristics information corresponding to the condensing criterion. The condensing criterion characteristics information database 350 may be a database that stores condensing criterion characteristics information. According to one embodiment, the condensing criterion characteristics information database 350 may be a server located outside of the video display device 100. According to another embodiment, the storage unit 175 may include the condensing criterion characteristics information database 350.

The condensing criterion characteristics information stored in the condensing criterion characteristics information database 350 may be received from an external database. Also, the condensing criterion characteristics information included in the condensing criterion characteristics information database 350 may be stored in response to input by a user. For example, the controller 20 may receive from the user an input with respect to a specific section of the contents, and the controller may extract characteristics information related to the specific section. The controller 20 may store the extracted characteristics information in the condensing criterion characteristics information database 350.

As such, the controller 20 may receive characteristics information corresponding to the condensing criterion from the condensing criterion characteristics information database 350.

With reference to FIG. 4, the controller 20 may receive contents (S107). The contents received may include at least audio contents and video contents. According to one embodiment, the video display device 100 may receive contents through at least the first tuner 120 or the second tuner 125 (see, e.g., FIG. 1). For example, the controller 20 may receive contents through satellite broadcasting, cable broadcasting, and/or terrestrial broadcasting. According to another embodiment, the controller 20 may receive contents through a network. For example, the controller 20 may receive contents through IPTV broadcasting or may acquire contents from a VOD server. According to another embodiment, the controller 20 may receive contents stored in the storage unit 175. For example, the controller 20 may read contents that are stored in the storage unit 175.

The controller 20 may demultiplex the received contents (S109). The controller 20 may demultiplex contents to extract at least video contents and audio contents. However, it will be appreciated that, when the contents are not multiplexed, it may not be necessary to demultiplex the contents.

The controller 20 may decode the demultiplexed contents (S111). Specifically, the controller 20 may decode contents to generate at least non-compressed video or non-compressed audio. However, it will be appreciated that, when the contents are already in a decoded state, it may not be necessary to decode the contents.

The controller 20 may extract characteristics information from comparison sections of the decoded contents (S113).

According to one embodiment, the characteristics information may be extracted from the comparison sections in a sequential manner.

The comparison section may be a specific section of the contents that is to be compared against condensing criterion characteristics information. The comparison section of the contents may include at least one sample of audio and/or video contents of a certain length. The controller 20 may extract characteristics information from at least non-compressed video and non-compressed audio of the comparison section. The controller 20 may extract characteristics information from a plurality of frames of video contents or audio contents.

According to one embodiment, the lengths of the comparison sections (e.g., the beginning and end points of each comparison section) are determined based on matching of extracted characteristics information to the condensing criterion. For example, a point of the contents at which extracted characteristics information begins to match the condensing criterion may correspond to a beginning of a comparison section. Likewise, the point of the contents at which the extracted characteristics information ceases to match the condensing criterion may correspond to the end of the comparison section. Accordingly, the length of the comparison section is determined.

When the extracted characteristics information is (or matches) characteristics information corresponding to the condensing criterion, an index may be generated (S115 and S117). The index indicates the corresponding comparison section as being a target output for the condensed version. For example, the controller 20 may generate an index that indicates the comparison section as being a target output, and may store the index in the condensed version storage unit 400 (see, e.g., FIG. 3). The index may indicate a specific point of the contents (a point corresponding to the comparison section) as being a target output for the condensed version. During the generation of the index, the controller 20 may store the corresponding criterion characteristics information. This will be described in more detail below.

The controller 20 may determine whether or not extracted characteristics information is similar to condensing criterion characteristics information (S115). For example, the controller 20 may determine whether or not a degree of similarity between the extracted characteristics information and the condensing criterion characteristics information meets or exceeds a certain reference ratio. The determination may be based on one or more parameters including at least frequency characteristics, zero crossing rate, tempo, average spectrum, spectral flatness, important nuance in a specific section, and bandwidth. For example, when the condensing criterion is a particular word, the controller 20 may determine whether or not the frequency characteristics of condensing criterion characteristics information corresponding to the particular word are similar to frequency characteristics of extracted characteristics information. Known processing techniques (e.g., processing techniques for speech recognition) may be employed.

As another example, when the condensing criterion is a voice print, the controller 20 may determine whether or not the frequency characteristics of condensing criterion characteristics information corresponding to the voice print are similar to frequency characteristics of extracted characteristics information. As another example, when the condensing criterion is an original sound track, the controller 20 may determine whether or not the frequency characteristics and tempo of the original sound track are similar to frequency characteristics and the tempo of extracted characteristics information. As another example, when the condensing criterion is a logo song of a program, the controller 20 may determine whether or not the frequency characteristics of the logo song of the program are similar to frequency characteristics of extracted characteristics information.

When the degree of similarity between the extracted characteristics information and condensing criterion characteristics information meets or exceeds a certain reference value (e.g., a reference ratio), the controller 20 may generate an index that indicates the comparison section of the contents as a target output for the condensed version (S117). As such, the comparison section will be included in the condensed version when the condensed version is output. This will be described in more detail later.

The controller 20 may determine whether or not the comparison section reaches an end point of the contents (S119).

When the comparison section does not reach the end point of the contents, the controller 20 may move to (e.g., create) a next comparison section (S121). As described earlier, a point at which extracted characteristics information ceases to match the condensing criterion characteristics information may mark the end of a created comparison section. This point may also mark the beginning of a next comparison section. According to this example, a further comparison section is created when a match between extracted characteristics information and the condensing criterion characteristics information is detected once again. As such, the beginning and end points of the comparison sections may be dynamically defined based on the condensing criterion.

In addition, the lengths of the comparison sections are variable (and not necessarily equal to each other). For example, the length of each comparison section may depend on the length of a corresponding match (or mismatch) between the extracted characteristics information and the condensing criterion. By way of example, the original contents may contain in the following sequence: a theme song at the first 30 seconds, main contents for 30 minutes, and a repeat of the theme song at the last 30 seconds. If the condensing criterion is the theme song, then, according to one embodiment, there will be three comparison sections. The respective lengths of the first, second and third comparison sections will be 30 seconds, 30 minutes, and 30 seconds.

Operations that were described earlier with reference to S113, S115, S117 and S119 of FIG. 4 are then performed on the next comparison section.

When the end point of the contents is reached (i.e., the comparison section reaches the end point of the contents), the controller 20 may output the condensed version (S123).

The outputting of the condensed version may include at least the generation of the condensed version or the playing of the condensed version. The outputting of the condensed version will be described in more detail below with reference to FIGS. 5(*a*), 5(*b*), 5(*c*) and 5(*d*).

With reference to FIG. 5(*a*), the entire contents are depicted. As depicted in FIG. 5(*a*), the entire contents include sections (e.g., portions or segments) A, B, C, D, E, F, G and H. By way of example, the sections B, D, F and H may include characteristics information that is sufficiently similar to condensing criterion characteristics information.

The generation of the condensed version and the output of the condensed version will be described with reference to FIG. 5(*b*). With reference to FIG. 5(*b*), the controller 20 may edit the contents in order to output the condensed version based on condensing criterion characteristics information. According to a further embodiment, the controller 20 may edit the contents to output the condensed version based on audio characteristics information. According to this embodiment, when the contents include video contents as well as audio contents, the editing of the contents may involve editing both video contents and audio contents that are included in the contents. Further, when the contents include video contents as well as audio contents, the editing of the contents may involve editing both video contents and audio contents that are included in the contents based on condensing criterion characteristics information.

The controller 20 may edit contents to output the condensed version based on analyzing comparison sections that include characteristics information (see, e.g., S113, S115, S117, S119, S121 of FIG. 4). Comparison sections other than those comparison sections that include characteristics information sufficiently similar to condensing criterion characteristics information may be deleted (or edited out). In this case, the controller 20 may delete those comparison sections that do not include characteristics information sufficiently similar to condensing criterion characteristics information.

However, according to one embodiment, the noted comparison sections are not entirely deleted. For example, margin portions of particular comparison sections may still be retained. According to one example, two of the noted comparison sections are both adjacent to a comparison section (which is retained and is not deleted). In this situation, margin portions of the two comparison sections may be retained. One margin portion is a margin portion of a first comparison section that is adjacent to the retained comparison section. This margin portion is adjacent to the start of the retained comparison section. The other margin is a margin portion of a second comparison section that is adjacent to the retained comparison section. This other margin portion is adjacent to the end of the retained comparison section. [QUESTION FOR LGE: Please advise whether this paragraph is accurate.]

According to one embodiment, the noted margin portions are retained. This is because margin portions of certain comparison sections may include important information (e.g., contextual information) even if these comparison sections do not include characteristics information that is sufficiently similar to condensing criterion characteristics information. According to one embodiment, the controller 20 may set the length of the margin section based on a user input. According to another embodiment, the controller 20 may set the length of certain start and end sections of the margin section based on predetermined setting.

As image quality increasingly improves, contents may increasingly include higher-quality images. Also, the video display device 100 may be required to store a large amount of contents over a given time period using a function such as series recording. Accordingly, a method for operating the video display device 100 which can more efficiently use the storage space of the video display device 100 may be useful.

When contents that are stored are subsequently edited based on condensing criterion characteristics information (see, e.g., FIGS. 5(*a*) and 5(*b*), the contents are effectively condensed, and the edited contents will not require (or occupy) as much storage space as the original contents. Because the storage space of the video display device 100 may be used to store only more important contents, the storage space can be used more efficiently.

As indicated earlier with reference to FIG. 5(*b*), the sections B, D, F and H include characteristics information that is sufficiently similar to condensing criterion characteristics information. As such, the controller 20 may edit the contents to generate the condensed version to include only the sections B, D, F, and H. As such, only the sections B, D, F, and H are output as the condensed version.

As described earlier, an index may be generated in order to indicate one or more comparison sections as target outputs for outputting the condensed version. According to one embodiment, the controller 20 may store the index in a form of a file.

The playing of the condensed version and the output of the condensed version according to embodiments of the invention will be described with reference to FIGS. 5C and 5D.

With reference to FIG. 5C, the controller 20 may employ trick mode to output the condensed version based on condensing criterion characteristics information. In particular, the controller 20 may execute trick mode on contents to output the condensed version based on condensing criterion characteristics information. Here, the controller 20 may execute trick mode using an index that indicates one or more corresponding comparison sections as being target outputs. While outputting the condensed version, the controller 20 may play a comparison section that is indicated as being a target output, and may then execute trick mode on the contents until a subsequent comparison section that is indicated as being a target output is reached.

For example, the controller 20 may play, at regular speed (e.g., 1×) a comparison section that is indicated as being a target output. If the next adjacent comparison section is not a target output, the controller may initiate forward fast play and continue performing the forward fast play until a next comparison section that is indicated as being a target output is reached. The controller 20 may find the next comparison section that is indicated as being a target output (i.e., the next comparison section including characteristics information sufficiently similar to condensing criterion characteristics information) using the index. Upon reaching the next comparison section that is indicated as being a target output, the controller may halt the forward fast play and may resume playing this comparison section at regular speed. Upon reaching a comparison section that is not a target output, the controller 20 may once again initiate forward fast play until it finds a next comparison section that is a target output. As such, the video display device 100 may provide the user with a condensed version of contents without receiving an explicit command from the user. That is, the condensed version, which involves autonomous operation of the trick mode (including forward fast play), is provided independent of user operation of a particular key or button (e.g., a "fast-forward" button that is provided in the remote controller 200 of FIG. 2).

As described earlier, margin portions of certain comparison sections may include important information (e.g., contextual information) even if these comparison sections do not include characteristics information that is sufficiently similar to condensing criterion characteristics information. Therefore, according to one embodiment, trick mode is not performed on such margin portions. Rather, such margin portions, along with comparison sections that are indicated as being target outputs, are played at regular speed. However, other portions, possibly including entire comparison sections, may be played using fast forward play.

According to one embodiment, the controller 20 may set the length of the margin portion based on a user input. According to another embodiment, the controller 20 may set the length of the margin portion based on a predetermined setting. The margin portions that are adjacent to start and end portions of a comparison section that is a target output may include content (e.g., contextual information) that is important for a user. Including such contextual information in the condensed version enables the video display device 100 to provide a more natural (e.g., fluid) viewing experience for the user.

With reference to FIG. 5C, the controller 20 may play sections A, B, C, D, E, F, G and H in sequence during output of the condensed version. Because sections A, C, E and G do not correspond to target outputs, each of these sections is played at 32× speed. In contrast, sections B, D, F and H (which correspond to target outputs) are played at normal (1×) speed.

With reference to FIG. 5D, the controller 20 may perform skip playing on contents to output the condensed version based on characteristics information. In particular, the controller 20 may perform skip playing on contents to output the condensed version based on audio characteristics information. In this case, the controller 20 may perform skip playing using an index that indicates particular comparison sections as being target outputs.

For example, the controller 20 may play, at regular speed (e.g., 1×) a comparison section that is indicated as being a target output. If the next adjacent comparison section is not a target output, the controller may initiate skip playing and skip to a next comparison section that is indicated as being a target output. The controller 20 may find the next comparison section that is indicated as being a target output (i.e., the next comparison section including characteristics information sufficiently similar to condensing criterion characteristics information) using the index. Upon finding the next comparison section that is indicated as being a target output, the controller may resume playing this comparison section at regular speed. Upon finding a comparison section that is not a target output, the controller 20 may once again initiate skip playing and skip to a next comparison section that is a target output. As such, the video display device 100 may provide the user with a condensed version of contents without receiving an explicit command from the user. That is, the condensed version, which involves autonomous operation of the skip playing, is provided independent of user operation of a particular key or button (e.g., a "skip-forward" button that is provided in the remote controller 200 of FIG. 2).

As described earlier, margin portions of certain comparison sections may include important information (e.g., contextual information) even if these comparison sections do not include characteristics information that is sufficiently similar to condensing criterion characteristics information. Therefore, according to one embodiment, skip playing is not performed on such margin portions. Rather, such margin portions, along with comparison sections that are indicated as being target outputs, are played (e.g., at regular speed). However, other portions, possibly including entire comparison sections, may be skipped.

According to one embodiment, the controller 20 may set the length of the margin portion based on a user input. According to another embodiment, the controller 20 may set the length of the margin portion based on a predetermined setting. The margin portions that are adjacent to start and end portions of a comparison section that is a target output may include content (e.g., contextual information) that is important for a user. Including such contextual information in the condensed version enables the video display device 100 to provide a more natural (e.g., fluid) viewing experience for the user.

With reference to FIG. 5(d), the controller 20 may not play section A because section A is not indicated as being a target output. Instead, the controller 20 immediately skips to section B (which does include characteristics information sufficiently similar to condensing criterion characteristics information) and plays section B (e.g., at regular speed). After playing section B, the controller 20 may not play section C because section C is not indicated as being a target output. Instead, the controller 20 immediately skips to section D (which does include characteristics information sufficiently similar to condensing criterion characteristics information) and plays section D (e.g., at regular speed).

With continued reference to FIG. 5(*d*), the controller 20 may not play section E because section E is not indicated as being a target output. Instead, the controller 20 immediately skips to section F (which does include characteristics information sufficiently similar to condensing criterion characteristics information) and plays section F (e.g., at regular speed). After playing section F, the controller 20 may not play section G because section G is not indicated as being a target output. Instead, the controller 20 immediately skips to section H (which does include characteristics information sufficiently similar to condensing criterion characteristics information) and plays section H (e.g., at regular speed).

According to the embodiment of FIG. 5(*d*), the controller 20 may output the condensed version through skip playing as described above.

Also, during output of the condensed version, the controller 20 may control the display unit 30 to display a progress bar that represents the whole length (or entire length) of the contents and includes a marker that indicates a current playing point. Further, the progress bar may provide indications corresponding to the condensed version.

For example, the controller 20 may mark a point where characteristics information sufficiently similar to condensing criterion characteristics information is located, using a GUI (Graphic User Interface) element on the progress bar. When characteristics information corresponding to different condensing criterion characteristics information is located, the controller 20 may use different GUI elements to mark the points where the characteristics information is located. For example, characteristics information corresponding to one condensing criterion is marked using a first GUI element, and characteristics information corresponding to another condensing criterion is marked using a second GUI element.

The GUI element may include at least a text indicator, a color indicator, or a figure. In particular, the controller 20 may mark a point where condensing criterion characteristics information is located using brightness and chroma of color on the progress bar. With respect to the progress bar, the controller 20 may mark the color of a section that contains characteristics information that is similar to condensing criterion characteristics information with a higher brightness or chroma. Also with respect to the progress bar, the controller 20 may mark, using text, a point where characteristics information that is sufficiently similar to condensing criterion characteristics information is located. The controller 20 may mark such a point using texts that indicate the corresponding condensing criterion characteristics information (or the corresponding condensing criterion). Accordingly, when the searching is performed based on different kinds of condensing criterion characteristics information, the controller 20 may mark a plurality of points where corresponding characteristics information is located using different texts corresponding to each kind of condensing criterion characteristics information. This will be described in more detail later with reference to FIGS. 6 and 7.

Also, the controller 20 may perform operations described with reference to the flowchart of FIG. 4 while executing a recording function of contents (e.g., while recording content such as broadcast content). Accordingly, the controller may output the condensed version simultaneously (or concurrently) with performing the recording.

According to one embodiment, the controller 20 may receive a condensed version request from a user while setting (or performing) the scheduled recording. When the condensed version request is received from a user, the controller 20 may output the condensed version simultaneously (or concurrently) with performing the recording. According to one embodiment, when a specific word is received as the condensing criterion and a news program featuring a plurality of news items is being recorded according to a scheduled recording setting, the controller 20 may output a condensed version of the news program based on the specific word.

According to a further embodiment, the controller 20 may output portions of the news program that include news items corresponding to the specific word and may not include portions that do not correspond to the specific word. According to another further embodiment, the controller 20 may play the former portions of the news program at normal speed while skipping the latter portions of the news program. According to another further embodiment, the controller 20 may play the former portions of the news program at a normal speed while playing the latter portions of the news program items at a faster speed than the normal speed.

Also, the controller 20 may output a condensed version upon performing time shifting. According to one embodiment, the controller 20 may generate the condensed version simultaneously (or concurrently) with performing time shifting recording, and may play the generated condensed version. According to another embodiment, the controller 20 may not generate the condensed version while performing time shifting recording, but may instead generate the condensed version while performing time shifting playing. The condensed version may be output using skip playing while performing time shifting playing, or using trick mode while performing time shifting playing.

According to embodiments involving time shifting recording and/or playing, the controller 20 may receive a user input requesting that playing (e.g., real-time display) of a currently broadcast program be stopped. The input may be received via a remote controller (e.g., remote controller 200 of FIG. 2). The controller 20 may stop the play of the currently broadcast program and begin recording the broadcast program. The recording of the broadcast may start from the point at which play was stopped. In this situation, the controller 20 may also generate the condensed version according to condensing criterion while recording the broadcast program, but may not yet output the condensed version. At a later time, when the controller 20 receives a user input requesting that the recorded broadcast program be played (e.g., via a remote controller), the controller 20 may play the generated condensed version instead of playing the entire recorded portion of the broadcast program at a normal speed (e.g., 1× speed).

When the condensed version is generated together with the recording of the broadcast program, the controller 20 may play (or output) the generated condensed version. When the condensed version is not generated together with the recording of the broadcast program, the controller 20 may generate a condensed version of the recorded broadcast program according to condensing criterion in order to play the condensed version, for example, after the recording is complete.

According to another embodiment involving time shifting recording, the controller 20 may record a currently broadcast program for time shifting playing regardless of whether a user input for the play stop of the current broadcast program or an earlier user input requesting that the recorded broadcast program be played is received. At a later time, when the controller 20 receives a user input requesting that the recorded broadcast program be played (e.g., via a remote controller), the controller 20 may play the recorded broadcast program from a previous play point corresponding to the user input according to the condensing criterion to output the condensed version.

When the condensed version is generated together with the recording of the broadcast program, the controller 20 may play (or output) the generated condensed version. When the condensed version is not generated together with the recording of the broadcast program, the controller 20 may generate a condensed version of the recorded broadcast program according to condensing criterion in order to play the condensed version, for example, after the recording is completed.

According to one embodiment, user inputs described with reference to the flowchart of FIG. 4 may be input using a space remote controller, for which a pointer moves according to movement of the remote controller of FIG. 2 in three-dimensional space. According to one embodiment, the controller 20 may receive the length of a margin section via the space remote controller (e.g., via movement of the space remote controller). According to another embodiment, the controller 20 may receive inputs from the space remote controller to start to output the condensed version. According to another embodiment, the controller 20 may receive inputs from the space remote controller to finish the output of the condensed version.

Figure 6:
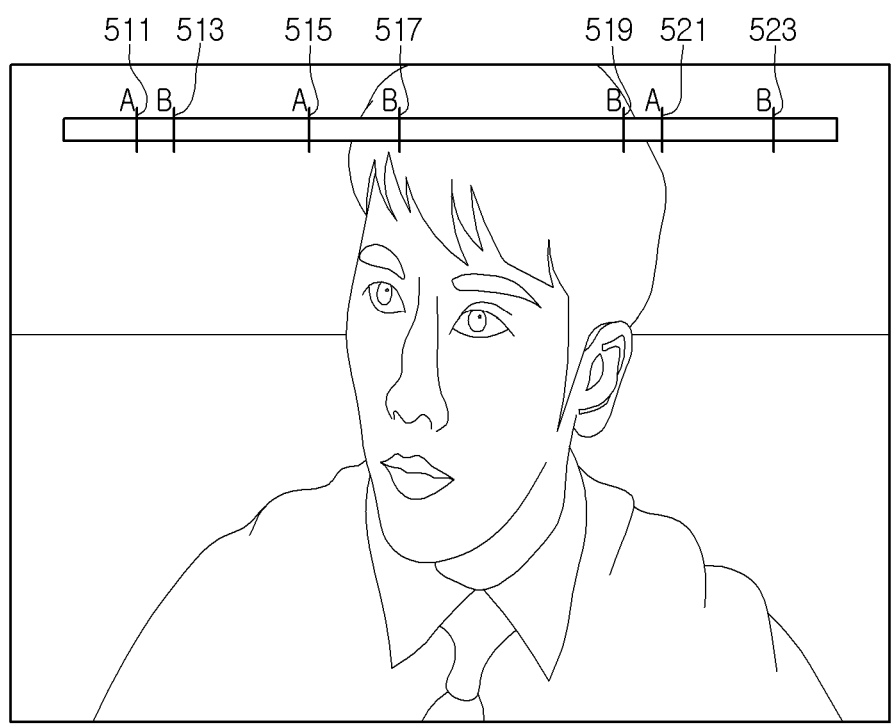
FIG. 6 is a view illustrating a graphic user interface showing a condensed version of contents according to an embodiment.

FIG. 6 illustrates a graphic user interface displayed during output of a condensed version of contents according to one embodiment.

With reference to FIG. 6, the condensing criterion characteristics information may relate to a leading actor/actress. Specifically, the condensing criterion characteristics information may include characteristics information for identifying an actor/actress A and characteristics information for identifying an actor/actress B.

During output of the condensed version, a progress bar 500 is displayed near the top of the display. According to one embodiment, the progress bar 500 represents the underlying entire contents corresponding to the condensed version. With respect to the progress bar 500, the controller 20 may mark sections which contain characteristics information similar to the condensing criterion characteristics information corresponding to actor/actress A or actor/actress B. For example, the controller 20 may mark sections which contain characteristics information similar to the condensing criterion characteristics information corresponding to actor/actress A using indicators 511, 515 and 521. Each of indicators 511, 515 and 521 may be identified using a particular label (for illustrative purposes only, shown as "A" in FIG. 6). Similarly, the controller 20 may mark sections which contain characteristics information similar to the condensing criterion characteristics information corresponding to actor/actress B using indicators 513, 517, 519 and 523. Each of indicators 513, 517, 519 and 523 is identified using a particular label (for illustrative purposes only, shown as "B" in FIG. 6).

Figure 7:
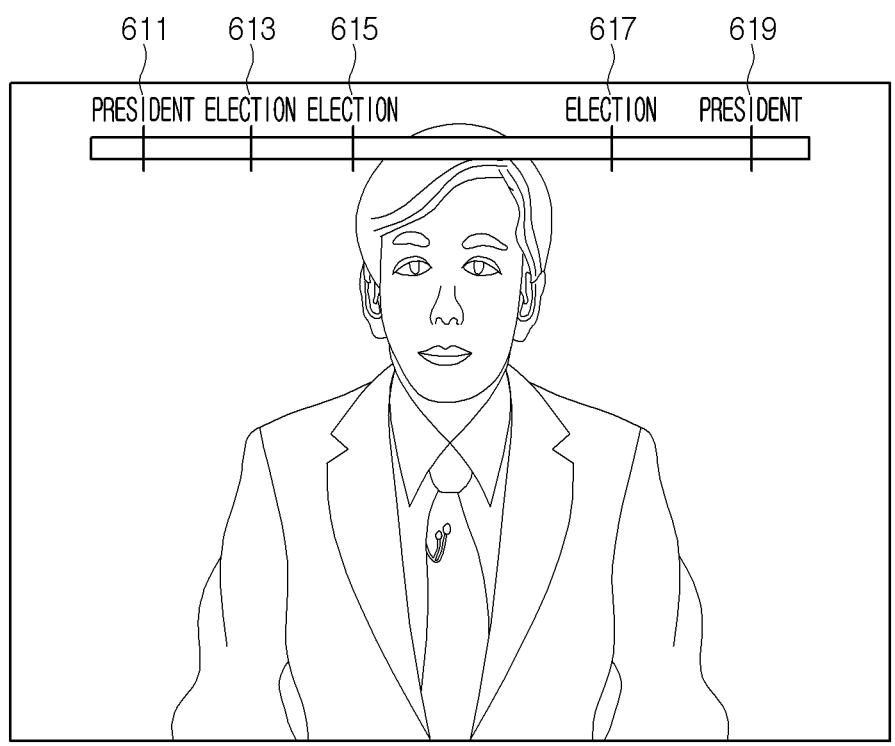
FIG. 7 is a view illustrating a graphic user interface showing a condensed version of contents according to another embodiment.

FIG. 7 illustrates a graphic user interface displayed during output of a condensed version of contents according to another embodiment.

With reference to FIG. 7, the condensing criterion characteristics information may relate to a main word (e.g., keyword). Specifically, the condensing criterion characteristics information may include characteristics information for identifying the word 'president' and characteristics information for identifying the word 'election'.

During output of the condensed version, a progress bar 600 is displayed near the top of the display. According to one embodiment, the progress bar 600 represents the underlying entire contents corresponding to the condensed version. With respect to the progress bar 600, the controller 20 may mark sections which contain characteristics information similar to the condensing criterion characteristics information corresponding to the word 'president' or the word 'election'. For example, the controller 20 may mark sections which contain characteristics information similar to the condensing criterion characteristics information corresponding to the word 'president' using indicators 611 and 619. Each of indicators 611 and 619 may be identified using a particular label (for illustrative purposes only, shown as 'PRESIDENT' in FIG. 7). Similarly, the controller 20 may mark sections which contain characteristics information similar to the condensing criterion characteristics information corresponding to the word 'election' using indicators 613, 615 and 617. Each of indicators 613, 615 and 617 may be identified using a particular label (for illustrative purposes only, shown as 'ELECTION' in FIG. 7). Based on this graphic user interface, a user can quickly see that selected information is contained in the entire contents. Also, a user can quickly find desired content.

As described above, the condensing criteria may include at least a word, a name of a main character, an original sound track, a sound effect, or a voice print of an actor/actress. When a word, a name of a main character and a voice print of an actor/actress are used as the condensing criteria, the controller 20 may summarize contents based on a synopsis (e.g., a written synopsis) of the contents. When a particular word is used as the condensing criterion, the video display device 100 may determine the parts of the contents that are related to the word and output only those parts as the condensed version. When the name of a main character is used as the condensing criterion, the video display device 100 may determine the parts of the contents that are related to the main character and output only those parts as the condensed version. When the voice print of an actor/actress is used as the condensing criterion, the video display device 100 may determine the parts of the contents that include lines spoken by the actor/actress to output only those parts as the condensed version.

When the original sound track and the sound effect are used as the condensing criteria, the controller 20 may summarize contents according to the mood of the contents. When a background mood is used as the condensing criterion, the video display device 100 may determine the parts of the contents related to the background mood to output only those parts as the condensed version. An example of the original sound track is a song or melody expressing the feelings of main characters (e.g., a love theme of the main characters). When the sound effect is used as the condensing criterion, the video display device 100 may determine the parts of the contents related to the sound effect to output only those parts as the condensed version. Examples of sound effects include a scream sound related to a horror scene and a shooting sound (e.g., gunshot) related to an action scene.

Also, when a combination of a main character's name, an original sound track, a sound effect, and a voice print of an actor/actress are used as the condensing criteria, the controller 20 may output a condensed version such that a user can readily discern both the mood and a synopsis of contents.

The above-described characteristics, structures, and features relate to particular embodiments of the present invention. Furthermore, it is understood that characteristics, structures, and features described with respect to particular embodiments may be combined or modified in various ways by a person of ordinary skill in the art. Therefore, it will be appreciated that the scope of this disclosure includes such combinations and/or modifications.

Although particular embodiments have been described with reference to a number of illustrative embodiments, it should be understood that numerous other modifications and embodiments that can be devised by those skilled in the art fall within the spirit and scope of the principles of this disclosure. More particularly, various variations and modifications are possible with respect to particular components and/or arrangements and fall within the scope of the disclosure, the drawings and the appended claims. In addition to variations and modifications in the component parts and/or arrangements, alternative uses will also be apparent to those of ordinary skill in the art.

What is claimed is:

1. A video display device configured to play contents comprising audio, the video display device comprising:
   a controller; and
   a display configured to display the contents,
   wherein the controller is configured to:
   receive a request for a condensed version of the contents,
   obtain a condensing criterion as a reference for outputting a condensed version of the contents,
   wherein the condensing criterion comprises at least a specific word, a name of a main character, an original sound track, a sound effect or a voice print of an actor,
   obtain a condensing criterion characteristic information included in a condensing criterion characteristics information database or in a storage unit of the video display device, which is an audio characteristics information, corresponding to the obtained condensing criterion, wherein the condensing criterion characteristic information is for identifying portions of the contents that match the condensing criterion,
   extract characteristic information from a specific section of the contents,
   wherein the specific section is a comparison section of the contents that is to be compared against the condensing criterion characteristics information that includes at least one sample of audio content;
   determine a degree of similarity between the characteristics information and the condensing criterion characteristics information based on one or more audio parameters,
   obtain at least one of indexes which respectively indicates the specific section as being a target output for the condensed version of the contents if the extracted characteristic information is matched with the obtained condensing criterion characteristic information, and
   edit the contents based on the audio characteristics information by analyzing the contents to identify a plurality of portions of the contents, retaining at least a first portion of the plurality of portions if the degree of similarity exceeds a certain reference value and discarding at least a second portion of the plurality of portions if the degree of similarity undershoots a certain reference value in order to output the condensed version.

2. The video display device of claim 1, wherein the controller is further configured to extract information regarding at least one of a genre, a name of the leading actor/actress, the name of a main character, or an original sound track for a specific broadcast program from electronic program guide (EPG) information and obtain the condensing criterion based on the extracted information.

3. The video display device of claim 1, wherein the controller is further configured to receive the condensing criterion from a user.

4. The video display device of claim 1, wherein the controller is further configured to employ trick mode based on the audio characteristics information in order to output the condensed version.

5. The video display device of claim 4,
   wherein the controller is adapted to employ the trick mode based on the audio characteristics information by:
   analyzing the contents to identify a plurality of portions of the contents;
   identifying at least a first portion of the plurality of portions, the at least a first portion having characteristics information similar to the audio characteristics information;
   identifying at least a second portion of the plurality of portions, the at least a second portion lacking characteristics information similar to the audio characteristics information;
   playing the at least a first portion at a first speed; and
   playing the at least a second portion at a second speed faster than the first speed.

6. The video display device of claim 1, wherein the controller is further configured to execute skip playing of the contents based on the audio characteristics information in order to output the condensed version.

7. The video display device of claim 6,
   wherein the controller is adapted to execute the skip playing based on the audio characteristics information by:
   analyzing the contents to identify a plurality of portions of the contents;
   identifying at least a first portion of the plurality of portions, the at least a first portion having characteristics information similar to the audio characteristics information;
   identifying at least a second portion of the plurality of portions, the at least a second portion lacking characteristics information similar to the audio characteristics information;
   playing the at least a first portion; and
   skipping play of the at least a second portion.

8. The video display device of claim 1, wherein the controller is further configured to control the display to display a progress bar for annotating the condensed version.

9. A method of operating a video display device to play contents comprising audio, the method comprising:
   receiving a request for a condensed version of the contents;
   obtaining a condensing criterion as a reference for outputting a condensed version of the contents,
   wherein the condensing criterion comprises at least a specific word, a name of a main character, an original sound track, a sound effect or a voice print of an actor,
   obtaining a condensing criterion characteristic information included in a condensing criterion characteristics information database or in a storage unit of the video display device, which is an audio characteristics information, corresponding to the obtained condensing criterion, wherein the condensing criterion characteristic information is for identifying portions of the contents that match the condensing criterion, extracting characteristic information from a specific section of the contents,
wherein the specific section is a comparison section of the content that is to be compared against the condensing criterion characteristics information that includes at least one sample of audio content;
determine a degree of similarity between the characteristics information and the condensing criterion characteristics information based on one or more audio parameters,
obtaining at least one of indexes which respectively indicates the specific section as being a target output for the condensed version of the contents if the extracted characteristic information is matched with the obtained condensing criterion characteristic information, and
edit the contents based on the audio characteristics information by analyzing the contents to identify a plurality of portions of the contents,
retaining at least a first portion of the plurality of portions if the degree of similarity meets or exceeds a certain reference value and discarding at least a second portion of the plurality of portions if the degree of similarity undershoots a certain reference value in order to output the condensed version.

10. The method of claim 9, further comprising:
extracting information regarding at least one of a genre, a name of the leading actor/actress, the name of a main character, or an original sound track for a specific broadcast program from electronic program guide, EPG, information
and obtain the condensing criterion based on the extracted information.

11. The method of claim 9, further comprising
receiving the condensing criterion from a user.

* * * * *